US006611886B1

United States Patent
Lee et al.

(10) Patent No.: US 6,611,886 B1
(45) Date of Patent: Aug. 26, 2003

(54) METHOD FOR TRANSFERRING VARIABLE ISOCHRONOUS DATA AND APPARATUS THEREFOR

(75) Inventors: Yoon-jick Lee, Seoul (KR); Sung-il Kang, Taejeon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/441,955

(22) Filed: Nov. 17, 1999

(30) Foreign Application Priority Data

Nov. 18, 1998 (KR) .............................. 98-49493

(51) Int. Cl.⁷ ................................ G06F 3/00
(52) U.S. Cl. .................. 710/45; 710/107; 710/113
(58) Field of Search ................. 710/107, 113, 710/4, 29, 45; 709/104, 220, 226, 222

(56) References Cited

FOREIGN PATENT DOCUMENTS

| JP | 10-200573 A | 7/1998 |
| JP | 10-233790 A | 9/1998 |
| KR | 1997-0056475 | 7/1997 |

*Primary Examiner*—Jeffrey Gaffin
*Assistant Examiner*—Niketa Patel
(74) *Attorney, Agent, or Firm*—Sughrue Mion, PLLC

(57) ABSTRACT

A method for transferring variable isochronous data and an apparatus therefor are provided. The method for transferring variable isochronous data includes the steps of (a) determining isochronous transfer to be terminated when the bus is in an idle state for a time interval which is larger than an isochronous gap period, (b) detecting a residual gap having a time interval which is larger than the time interval of an isochronous gap and smaller than the time interval of a subaction gap, (c) checking whether bandwidth for the transfer of isochronous data remains when the residual gap is detected in the step (b), and (d) transferring the isochronous data when it is determined that the bandwidth for the transfer remains in the step (c). According to the variable isochronous data transfer method, it is possible to maximize the isochronous transfer by selectively using the residual bandwidth, which is assigned for the transfer of the isochronous data but is not used for the real transfer of the isochronous data, for the transfer of the isochronous data.

10 Claims, 11 Drawing Sheets

METHOD FOR TRANSFERRING VARIABLE ISOCHRONOUS DATA AND APPARATUS THEREFOR

BACKGROUND OF THE INVENTION

1. Field of the Invention

The present invention relates to a method for transferring isochronous data and an apparatus therefor, and more particularly, to a method for transferring variable isochronous data using the IEEE 1394 standard.

2. Description of the Related Art

It is possible to transfer data at a high speed by the IEEE 1394 serial bus. It is also possible to perform real time data transfer for a multimedia application by the IEEE 1394 bus. FIG. 1 shows the cycle configuration of the IEEE 1394 bus according to a conventional technology. In the IEEE 1394 bus, the maximum bandwidth of an isochronous transfer phase (100 $\mu$s) and the minimum bandwidth of an asynchronous transfer phase (25 $\mu$s) are specified in the P-1 394 specification. In general, isochronous transfer is used for real time data transfer and asynchronous transfer is used for data transfer for various commands such as reproduction, rewind, pause, and change of channels. Therefore, the maximum bandwidth of an entire isochronous cycle (125 $\mu$s) is specified.

FIG. 2 shows the gap timing of the IEEE 1394 bus according to a conventional technology. Referring to FIG. 2, isochronous packets, to which an arbitration bit, a data prefix bit, and a data end bit are added, are transferred with isochronous gaps interleaved therebetween. An acknowledge packet which indicates acknowledgement of a request, can be transferred after an acknowledge gap.

In order to explain the isochronous transfer of a packet having the above gap timing, the main steps of a method of assigning isochronous bandwidth in the IEEE 1394 bus according to the conventional technology are shown in FIG. 3. A node which manages the IEEE 1394 bus can be an isochronous resouce manager (IRM), according to a control situation. The node which becomes the IRM includes a bandwidth available (BA) register which manages isochronous resources, in a control and status register (CSR) defined by the IEEE 1394 bus standard. Other nodes in the IEEE 1394 bus read the value of the BA register of the IRM in order to perform an isochronous transfer. Then, it is determined whether there is bandwidth to be assigned and the isochronous transfer is performed when there is bandwidth to be assigned. At this time, the entire available bandwidth is generally assigned in a process of assigning the bandwidth. However, the entire assigned bandwidth is not used in a real isochronous transfer process. Also, in the IEEE 1394 bus, the bandwidth is assigned, assuming that transfer, according to a corresponding application of a node, is in the form of a constant bit rate (CBR) of an asynchronous transfer mode (ATM). Therefore, when the transfer is in the form of a variable bit rate, residual bandwidth results. For example, applications using the IEC-61833 standard are given much weight in the IEEE 1394 applications. In the isochronous transfer method for audio/video devices according to the IEC-61833 standard, it is specified that only a header is transferred to a corresponding isochronous cycle when there is no data to be transferred. As a result, in such a case, the entire assigned bandwidth is not used, and there are cases where only necessary data is transferred only when necessary in order to prevent the repeated transfer of data and to facilitate the controlling of a buffer. Thus, pertinent all, the assigned bandwidth is not used.

FIG. 4 shows the relationship between the assignment of bandwidth and the use of bandwidth in the IEEE 1394 bus according to the conventional technology. Referring to FIG. 4, the horizontal axis shows the degree of the use of an isochronous channel and the vertical axis shows bandwidth available. Since the assigned bandwidth increases as the use of the channel increases, free bandwidth is relatively reduced. However, since the entire assigned bandwidth is not used during the real isochronous transfer as mentioned above, residual bandwidth is generated as shown in FIG. 4. Therefore, in the method for transferring the isochronous data according to the conventional technology, the bandwidth is not effectively used. Also, no more bandwidth can be assigned although there is bandwidth which can be used after a break point.

It will now be explained how isochronous and asynchronous transfer modes supported in the 1394 bus are distinguished from each other and how the channels and bandwidth used for the isochronous transfer are managed. Also, the transfer service of the isochronous transfer mode of the 1394 bus will be simply compared with the transfer service of the asynchronous transfer mode (ATM).

The 1394 bus provides two transfer modes, namely, an isochronous transfer mode and an asynchronous transfer mode. In isochronous transfer, one packet can be transferred every isochronous cycle of 125 $\mu$s to provide real-time transfer. Meanwhile, in the asynchronous transfer, which is a transfer mode where data transfer is guaranteed, the data transfer is controlled by a fairness interval where all connected modes can transfer data only once in the interval. Isochronous and asynchronous data are transferred for one isochronous cycle, which is started by the cycle start packet transferred from a root node. The isochronous transfer is prior to the asynchronous transfer. However, in order to prevent a situation where the asynchronous transfer can not be performed at all due to the isochronous transfer, only 80% of the entire cycle can be used for the isochronous transfer. Namely, at least 20% of the entire cycle can be used for the asynchronous transfer. If the isochronous transfer does not exist, the entire cycle can be used for the asynchronous transfer.

TABLE 1

| | | Transfer classification | | |
| --- | --- | --- | --- | --- |
| | | | Asynchronous | |
| Characteristics | Isochronous | Read/Write | Broadcast write | Stream channel |
| Time guaranteed | Yes | No | No | No |
| Arrival guaranteed | No | Yes | No | No |
| Broadcast | Yes | No | Yes | Yes |
| Channel shared | Not specified | Not concerned | | Yes |

As shown in Table 1, asynchronous read and write, asynchronous broadcast write, and asynchronous stream channel which is newly defined in the P1394a specification can be used in the ATM. Here, guaranteed delivery of data through an identification process can be performed only by the asynchronous read and write.

Channels and bandwidth of the IEEE 1394 bus are respectively assigned using the values of two registers, CHANNELS_AVAILABLE (CA) and BANDWIDTH_AVAILABLE (BA) of the IRM which are determined after resetting the bus. The channels and bandwidth must be previously assigned from the IRM to an application wherein isochronous transfer of data is desired to be performed using asynchronous lock transaction in order to maintain integrity of resource information. Accordingly, a concerned node can transfer data of an assigned bandwidth using the assigned channels and bandwidth regardless of whether other nodes use the bus. Namely, it can be considered as using an additional physical channel having a bandwidth as large as the assigned bandwidth. Since the assignment unit of the isochronous bandwidth is calculated using the time taken to send 1 quadlet of 4 bytes in S1600 (1.6 Gbps) specification, the initial value of the BA register becomes 4915. The value four times the value read from the BA must be assigned as a bandwidth assignment value in S400 specification. In the case of the asynchronous stream service defined in the P1394a standard, channels are used like in the isochronous service, however, the bandwidth is not assigned. Therefore, the asynchronous stream service cannot be used for real-time transfer.

The largest difference between the 1394 transfer and the ATM transfer lies in the sizes of transfer units. A packet having a variable size where the maximum size of the transfer unit is determined in proportion to transfer speed is used in the 1394 transfer. Meanwhile, a cell having a fixed size of 53 bytes is used as the transfer unit for high speed processing in the ATM transfer. Another difference lies in that a transfer line to which a switch is connected can be controlled in the ATM transfer and that the use of the bus by other nodes cannot be directly controlled in the 1394 transfer. It is difficult to effectively use the bandwidth, maintaining uniform transfer ability and characteristics when the 1394 transfer is used together with the ATM transfer due to basic differences. Therefore, a method of decreasing such differences must be provided. The IEEE 1394 specification is similar to the Ethernet, which is widely used as a LAN, excluding the isochronous transfer function. The transfer characteristic of the 1394 transfer is simply compared with the transfer characteristic of the ATM transfer in Table 2.

TABLE 2

| Transfer classification | IEEE 1394 | ATM |
| --- | --- | --- |
| Physical medium | Shared (multiple access) | Private/Switching (point to point) |
| Addressing | Operation node ID (IEEE-1212) | Fixed address |
| Data unit | Variable length packet | Fixed cell (53 bytes) |
| Transfer rate control | Non-connection | Connection (VPC and VCC) |
| Fairness | Packet size based bandwidth | Cell rate based bandwidth |
| Real time transfer | HN, DAN, and CAN | LAN, MAN, and WAN |

The QOS characteristic of the ATM transfer is shown in Table 3.

TABLE 3

| | QOS | | | |
| --- | --- | --- | --- | --- |
| Characteristics | Constant bit rate (CBR) | Variable bit rate (VBR) | Available bit rate (ABR) | Unspecified bit rate (UBR) |
| CDV (cell delay variable) | Yes | Yes | No | No |
| CTD (cell transfer delay) | No | Yes | No | No |

TABLE 3-continued

| | QOS | | | |
| --- | --- | --- | --- | --- |
| Characteristics | Constant bit rate (CBR) | Variable bit rate (VBR) | Available bit rate (ABR) | Unspecified bit rate (UBR) |
| CLR (cell loss ratio) | Yes | Yes | Yes | No |
| Variables for preparing bandwidth | Not specified | PCR and SCR | PCR and MCR | Non (perform optimal effort) |

As shown in Table 3, there are four services, CBR, VBR, ABR, and UBR in the ATM transfer service as shown in Table 3. Real-time transfer can be performed by the services, CBR and VBR among these services.

However, the isochronous transfer of the IEEE 1394 corresponds to the CBR service for processing data having a specific bit rate in view of the ATM. The asynchronous transfer, where delivery by the best-effort is assumed, is similar to the UBR service of the ATM, excluding the guaranteed delivery characteristic. For example, the bandwidth of the ATM is first assigned to the CBR and VBR services and the remaining bandwidth is assigned to the ABR and UBR services. The ABR service has the characteristics of both the VBR and UBR services. As a result, according to the conventional 1394 standard, the VBR and ABR services of the ATM are not properly supported.

SUMMARY OF THE INVENTION

To solve the above problem, it is an object of the present invention to provide a variable isochronous data transfer method for transferring isochronous data using residual bandwidth, which is not used for the transfer of isochronous data, among assigned channels.

It is another object of the present invention to provide a variable isochronous data transfer apparatus for realizing the above method.

It is another object of the present invention to provide a variable isochronous data transfer method for transferring isochronous data using residual bandwidth, which is not used for the transfer of isochronous data, among assigned channels and supporting a variable bit rate corresponding to an ABR service.

It is another object of the present invention to provide a variable isochronous data transfer apparatus for realizing the above method.

It is another object of the present invention to provide a variable isochronous data transfer method for transferring isochronous data using residual bandwidth, which is not used for the transfer of isochronous data, among assigned channels, supporting a variable bit rate corresponding to an ABR service, and performing real time transfer.

It is another object of the present invention to provide a variable isochronous data transfer apparatus for realizing the above method.

Accordingly, to achieve the first object, there is provided a variable isochronous data transfer method for transferring data of a predetermined time interval within a predetermined time on the IEEE 1394 bus, comprising a detection step of indicating that there is residual bandwidth, which is not used for the transfer of isochronous data, among assigned bandwidth, and detecting residual gaps having a predetermined time interval and a variable isochronous transfer step of determining whether bandwidth for isochronous transfer of data remains when the residual gap is detected in the detection step and transferring the isochronous data according to determination result. The time interval of the residual gap detected in the detection step is larger than an isochronous gap and smaller than a subaction gap.

Also, the variable isochronous transfer step comprises a first detection step of detecting an isochronous reset gap and a second determination step of determining whether there is enough residual bandwidth in which to perform the isochronous transfer of data when the isochronous reset gap is detected in the first detection step. Also, the variable isochronous transfer step comprises a step of transferring an isochronous packet when it is determined that there is enough residual bandwidth in the second determination step and a second detection step of detecting an isochronous reset gap, returning the process to the second determination step when the isochronous reset gap is detected, and proceeding the process to an asynchronous phase when the isochronous reset gap is not detected.

Also, the variable isochronous data transfer method according to the present invention preferably further includes a first determination step of determining whether the transfer of data is performed in the current isochronous reset gap when the isochronous reset gap is detected in the first detection step. The second determination step preferably further comprises a step of determining whether there is enough residual bandwidth in which to perform the isochronous transfer when it is determined that there is no transfer of data in the first determination step.

In order to achieve the second object, there is provided a variable isochronous data transfer apparatus according to the present invention for transferring data of predetermined bandwidth within a predetermined time on the IEEE 1394 bus, including means for indicating that there is residual bandwidth which is not used for the transfer of the isochronous data in the assigned bandwidth and for detecting a residual gap having a predetermined time interval, and variable isochronous transfer means for determining whether bandwidth for the isochronous transfer of data remains when the residual gap is detected by the detection means and transferring the isochronous data according to the determination result.

The residual gap detection means comprises a clock signal generator for outputting a clock signal of a predetermined period, an idle detector for detecting an idle state, a counter for digitizing the clock signal in response to the clock signal output from the clock and digitizing an idle state detection signal output from the idle detector, and a decoder for determining the time interval of the idle state according to the digitized value of the counter. Also, the residual gap detection means comprises an isochronous gap detector for indicating the start of the isochronous data and detecting an isochronous gap having a predetermined first time interval, a residual gap detector for indicating the start of the residual bandwidth and detecting the residual gap having a second predetermined time interval which is larger than the first time interval, a subaction gap detector for indicating the start of an asynchronous transfer phase and detecting a subaction gap having a third predetermined time interval which is larger than the second predetermined time interval, and an arbitration reset gap detector for indicating that arbitration reset is requested and detecting an arbitration reset gap having a fourth predetermined time interval which is larger than the third predetermined time interval.

Also, when a time interval between the time interval of the isochronous gap and the time interval of the subaction gap is T and an arbitrary integer larger than 1 is N, the clock signal output from the clock signal generator has a period of T/N.

In order to achieve the third object of the present invention, there is provided an isochronous data transfer method realized in a variable isochronous data transfer apparatus including a variable isochronous transfer buffer (VITF), a constant isochronous transfer buffer (CITF), and an asynchronous transfer buffer (ATF), for isochronously transferring data within a predetermined time on the IEEE 1394 bus, comprising the steps of transferring isochronous data through the CITF in an isochronous phase, transferring ABR data through the VITF in a variable isochronous phase, moving the portion corresponding to minimum bandwidth (MBW) in the ABR data output through the VITF from the VITF to the CITF and transferring the portion corresponding to the MBW through the CITF in the isochronous phase, and transferring asynchronous data through the ATF in an asynchronous phase.

In order to achieve the fourth object of the present invention, there is provided an isochronous data transfer apparatus for isochronously transferring data within a predetermined time interval on the IEEE 1394 bus, comprising a constant isochronous transfer buffer (CITF) for storing and outputting isochronous data in a first-in first-out (FIFO) manner in order to transfer the isochronous data in an isochronous phase, a variable isochronous transfer buffer (VITF) for storing and outputting ABR data in the FIFO manner in order to transfer the ABR data in a variable isochronous phase, feed-back means for moving the portion corresponding to the MBW in the ABR data output through the VITF from the VITF to the CITF and transferring the portion corresponding to the MBW through the CITF in the isochronous phase, and an asynchronous transfer buffer (AFT) for storing and outputting asynchronous data in the FIFO manner in order to transfer the asynchronous data in an asynchronous phase.

In order to achieve the fifth object of the present invention, there is provided a variable data transfer method for isochronously transferring data within a predetermined time on the IEEE 1394 bus, comprising the steps of (a) determining that isochronous transfer of data is terminated when the bus is in an idle state for a time interval longer than an isochronous gap period and detecting a residual gap having a first predetermined time interval which is larger than the time interval of the isochronous gap and smaller than the time interval of a subaction gap, (b) determining whether the detected gap is an isochronous reset gap having a second predetermined time interval which is larger than the first predetermined time interval and smaller than the time interval of the subaction gap, (c) enabling an isochronous arbitration reset bit when the detected gap is determined to be the isochronous reset gap in the determination step, (d) determining whether the isochronous reset bit is enabled when it is determined that the detected gap is not the isochronous reset gap in the determination step and proceeding the process to an asynchronous phase, (e) determining whether real-time transfer packets exist, (f) checking timing when real-time transfer packets exist in the step (e), throwing away the packets which deviate from a real-time reference, and transferring the packets which do not deviate from the real-time reference, (g) determining whether bandwidth is sufficient with respect to packets which are not real-time packets and packets which are real-time packets and do not deviate from the real-time reference, and performing arbitration with respect to real time packets and packets which are not real-time, (h) transferring the packets when the arbitration is successful, and (i) transiting a phase to the asynchronous phase.

In order to achieve the sixth object of the present invention, there is provided an isochronous data transfer apparatus for isochronously transferring data within a predetermined time interval on the IEEE 1394 bus, comprising means for determining that isochronous transfer of data is terminated when the bus is in an idle state for a time interval longer than an isochronous gap period and detecting a residual gap having a first predetermined time interval which is larger than the time interval of the isochronous gap and smaller than the time interval of a subaction gap, means for determining whether the detected gap is an isochronous reset gap having a second predetermined time interval which is larger than the first predetermined time interval and smaller than the time interval of the subaction gap, means for enabling an isochronous arbitration reset bit when the detected gap is determined to be the isochronous reset gap by the detection means, means for determining whether the isochronous reset bit is enabled when it is determined that the detected gap is not the isochronous reset gap by the determination means and driving an asynchronous transfer mode when the isochronous reset bit is not enabled, means for determining whether real-time transfer packets exist, means for checking timing when real-time transfer packets exist, throwing away the packets which deviate from a real-time reference, and transferring the packets which do not deviate from the real-time reference, means for determining whether bandwidth is sufficient with respect to packets which are not real-time packets and packets which are real-time packets and do not deviate from the real-time reference, means for transferring the packets when the arbitration is successful, and means for performing asynchronous transfer of data.

BRIEF DESCRIPTION OF THE DRAWING(S)

The above objects and advantages of the present invention will become more apparent by describing in detail a preferred embodiment thereof with reference to the attached drawings in which.

Figure 11:
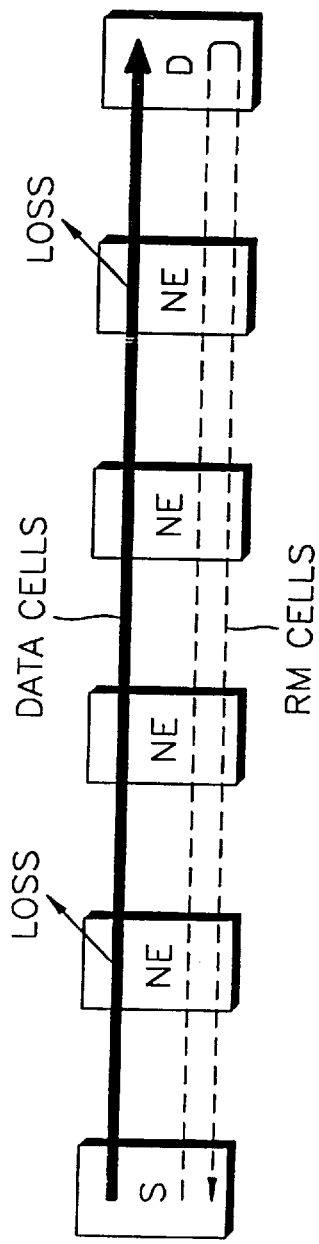
Figure 12:
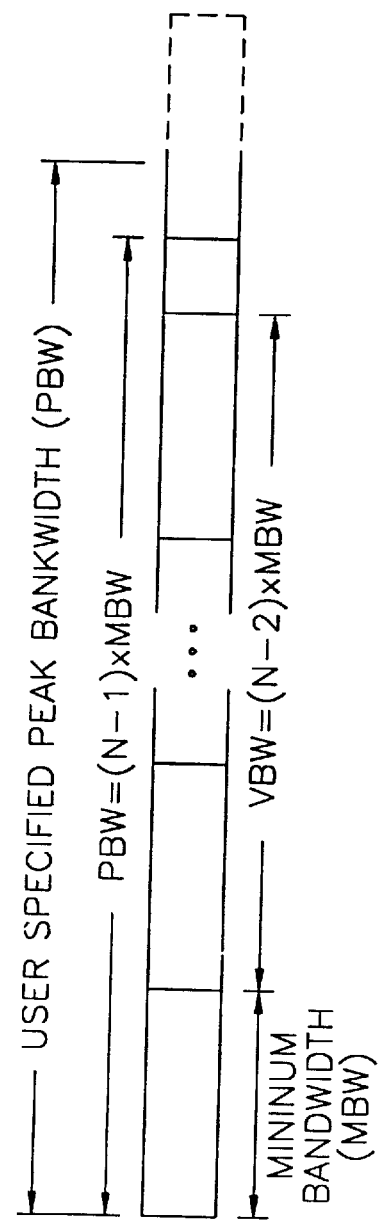
Figure 13:
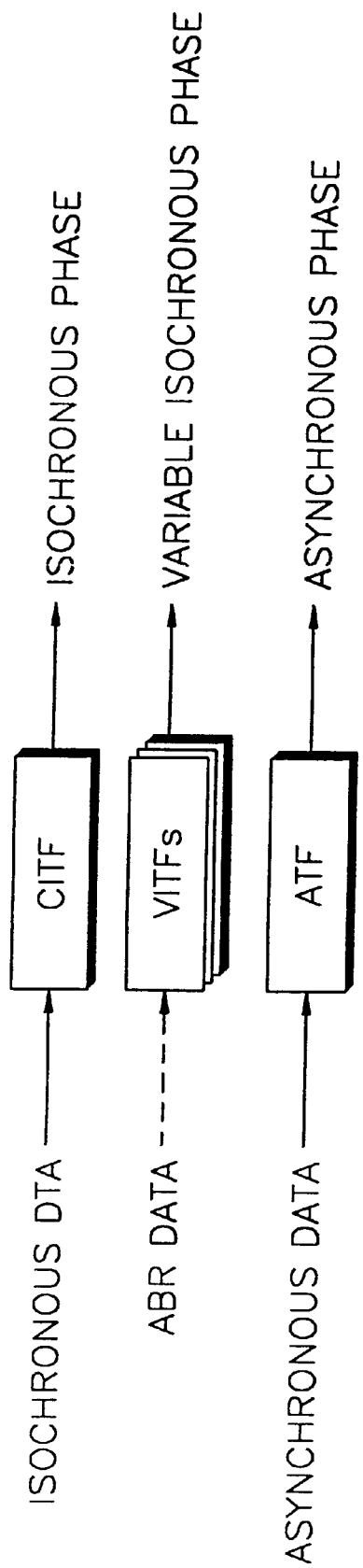
Figure 14:
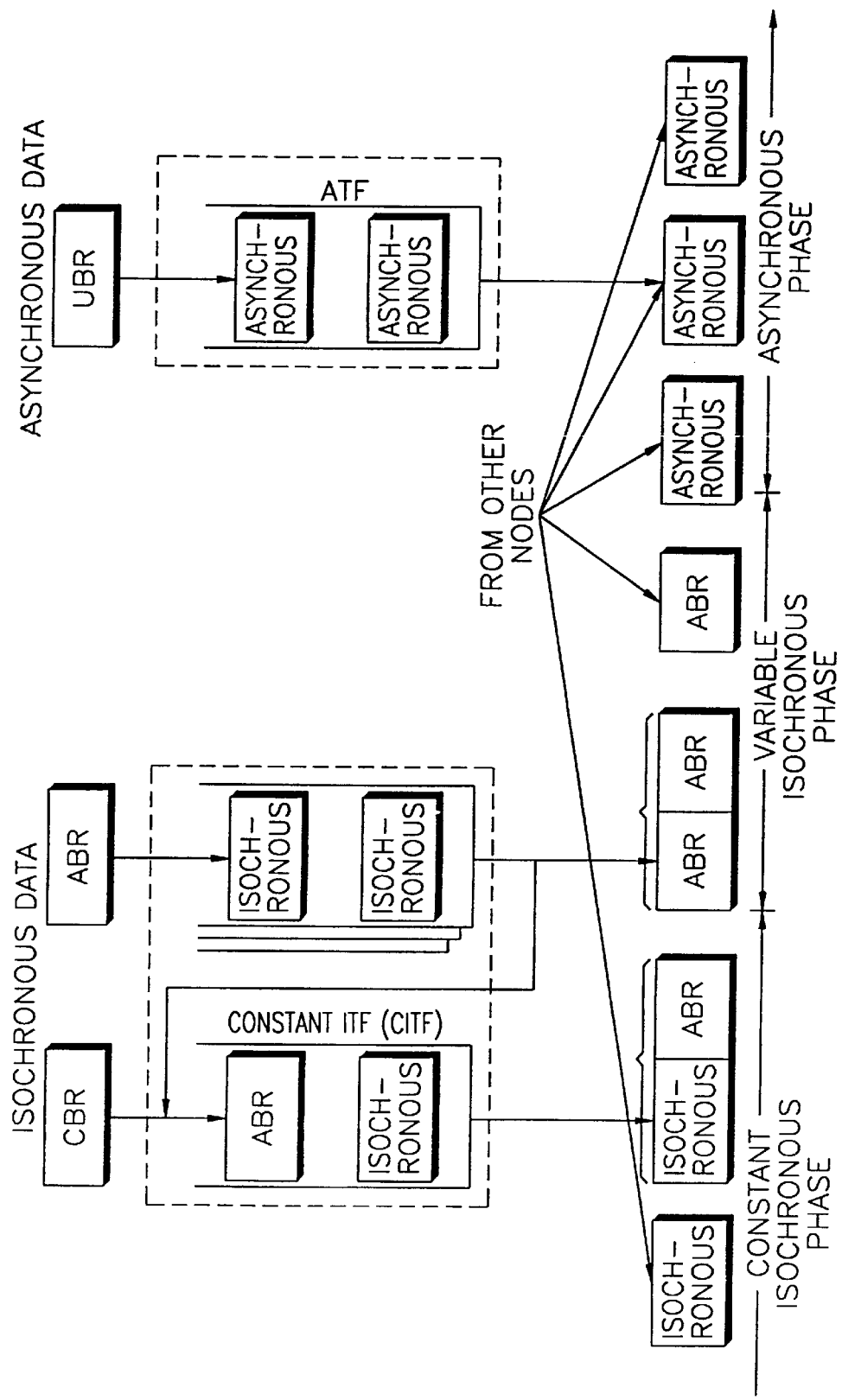
Figure 15:
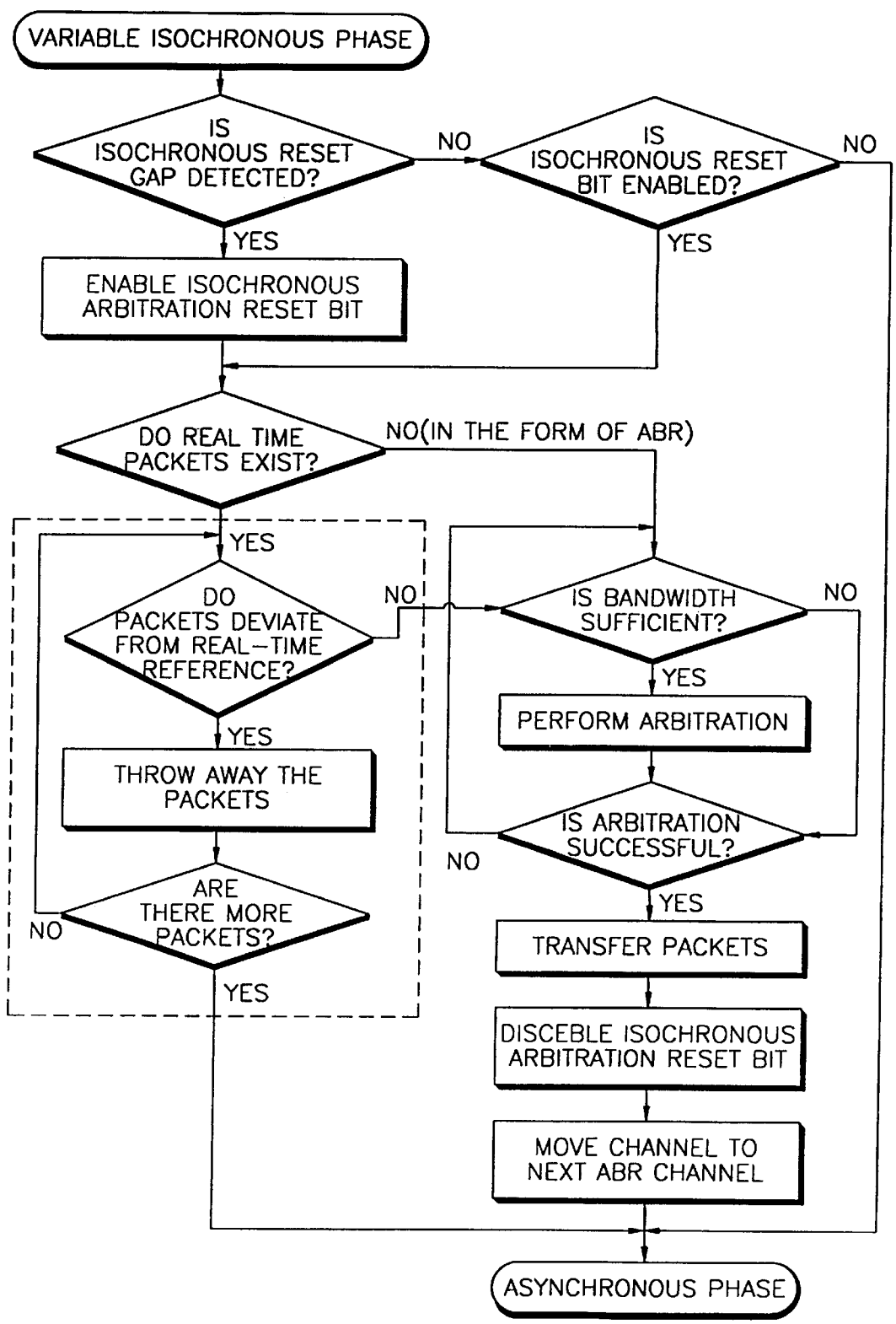

FIG. 11 describes the control of the flow of an ABR service applied to the variable isochronous transfer method according to the embodiment of the present invention;

FIG. 12 shows the structure of bandwidth in a variable isochronous transfer method according to another embodiment of the present invention;

FIG. 13 shows the structure of a buffer for realizing the ABR-1394 data transfer as the variable isochronous data transfer method according to another embodiment of the present invention;

FIG. 14 shows an example of processes of transferring data by the variable isochronous data transfer method according to another embodiment of the present invention; and FIG. 15 is a block diagram for showing the main steps of the variable isochronous transfer method according to another embodiment of the present invention.

DESCRIPTION OF THE PREFERRED EMBODIMENTS

Figure 1:
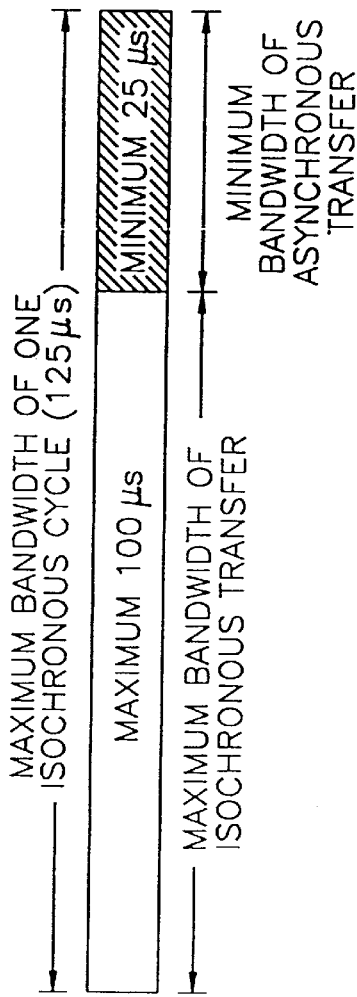
FIG. 1 shows the cycle configuration of the IEEE 1394 bus according to a conventional technology.
Figure 2:
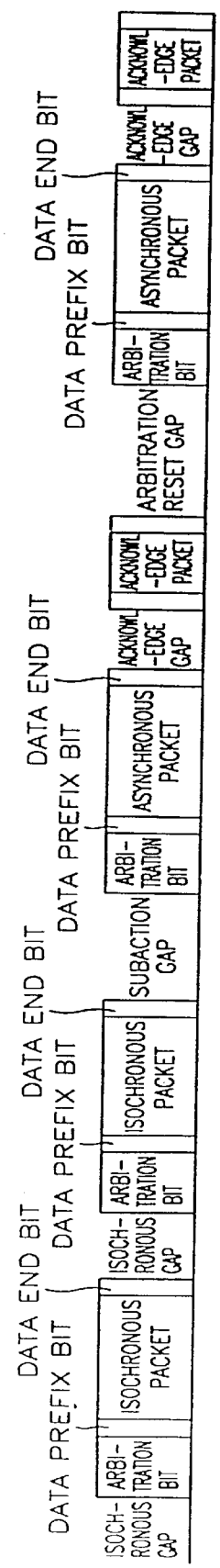
FIG. 2 shows the gap timing of the IEEE 1394 bus according to the conventional technology.
Figure 3:
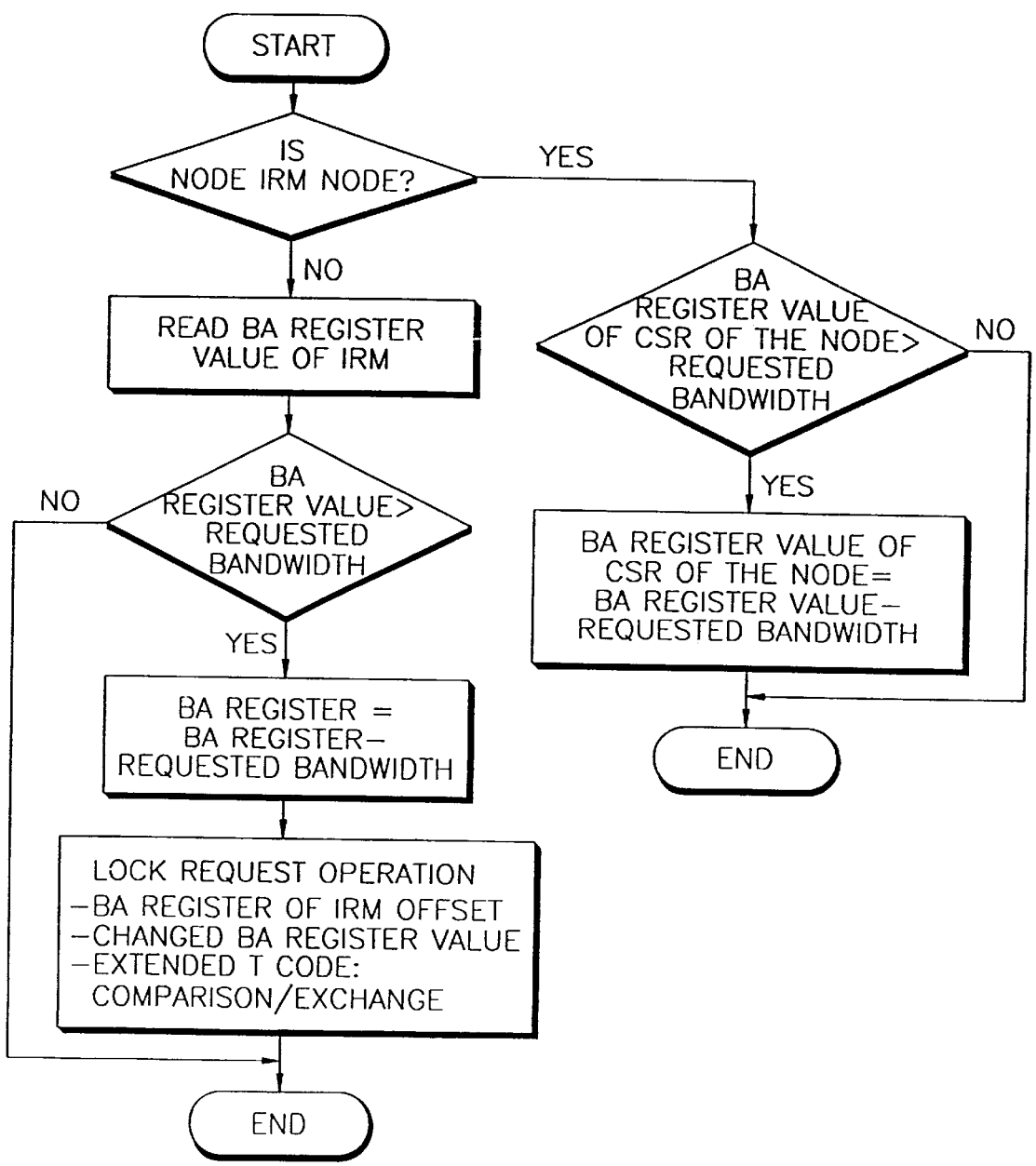
FIG. 3 is a flowchart for describing a method of assigning isochronous bandwidth in the IEEE 1394 bus according to the conventional technology.
Figure 4:
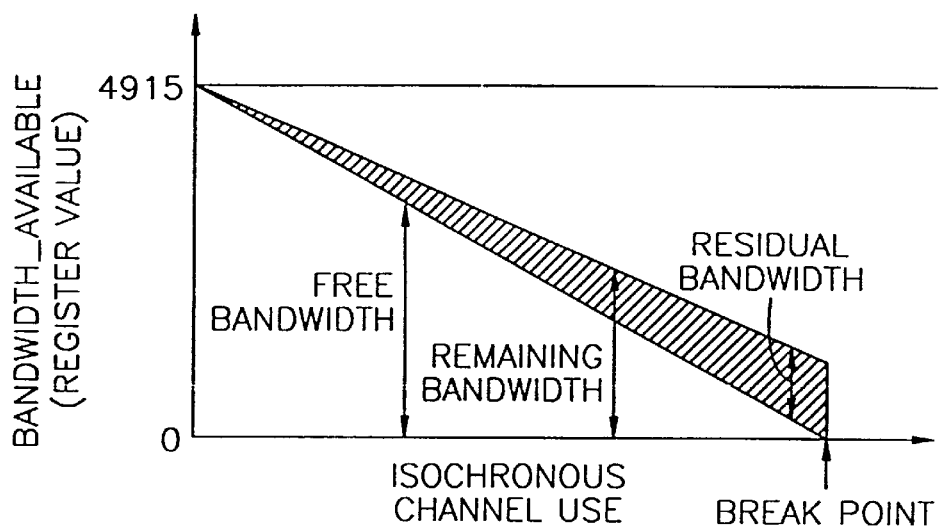
FIG. 4 shows a relationship between the assignment of bandwidth and the use of bandwidth in the IEEE 1394 bus according to the conventional technology.
Figure 5:
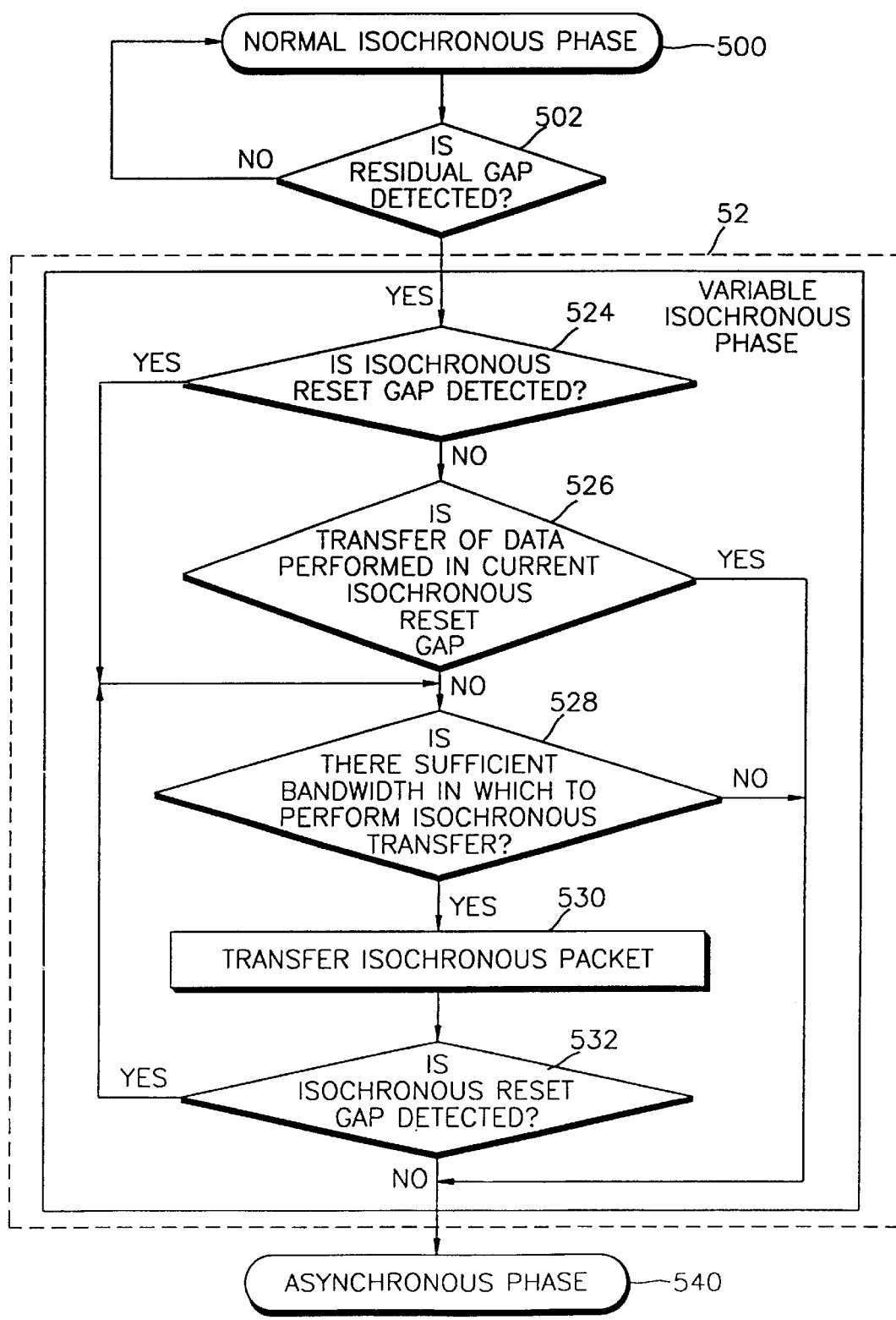
FIG. 5 is a flowchart for showing the main steps of a variable isochronous transfer method according to an embodiment of the present invention.

FIG. 5 is a flowchart for showing the main steps of a variable isochronous transfer method according to an embodiment of the present invention. Referring to FIG. 5, the variable isochronous data transfer method according to the present invention includes a step 502 of detecting a residual gap and a variable isochronous transfer step 52.

In the residual gap detection step 502, the residual gap is detected by checking a time interval which maintains an idle state. Namely, the residual gap has a predetermined time interval, which is distinguished from other gaps, and indicates that there is residual bandwidth which is not used for the transfer of isochronous data in assigned bandwidth. Although not shown, when the bus is in an idle state for a time longer than an isochronous gap period in a normal isochronous transfer step 500, the residual gap is detected by performing a step (not shown) of determining that the isochronous transfer is terminated and checking the time interval which maintains the idle state.

The variable isochronous transfer step 52 includes a first detection step 524, first and second determination steps 526 and 528, an isochronous packet transfer step 530, and a second detection step 532. An isochronous reset gap is detected in the first detection step 524. The isochronous reset gap for setting an isochronous fairness interval has a time interval larger than the residual gap and smaller than the subaction gap. Namely, since there is high possibility that a node close to the root node occupies the bus, in the IEEE 1393 bus, the isochronous fairness interval is set in order to let a node perform the isochronous transfer only once in the interval. When the isochronous reset gap is detected in the first detection step, it is then determined whether the transfer of data is performed in the current isochronous reset gap in the first determination step 526. When it is determined that the transfer of data is not performed in the first determination step, it is determined whether there is enough residual bandwidth in which to perform the isochronous transfer in the second determination step 528. When it is determined that there is enough residual bandwidth in the second determination step, an isochronous packet is transferred (530). In the second detection step 532, the isochronous reset gap is detected, the process returns to the second determination step when the isochronous reset gap is detected, and the process proceeds to an asynchronous phase when the isochronous reset gap is not detected. Therefore, when the isochronous reset gap is detected, the transfer of the isochronous data is performed. When the isochronous reset gap is not detected, it is checked whether the transfer of the isochronous data is performed in the isochronous reset gap and the transfer of the isochronous data is performed. Fairness is achieved in the transfer of isochronous data among a plurality of nodes.

The respective steps of the variable isochronous transfer method according to the present invention can be realized by inputting appropriate program codes to a physical (PHY) chip as understood by those skilled in the art. Also, the above-mentioned variable isochronous transfer method according to the present invention can be written as a program which can be executed by computers and can be realized by general purpose digital computers which operate the program from computer readable media. The media include magnetic recording media such as floppy disks and hard disks, optical recording media such as CD-ROMs and DVDs, and storing media such as carrier wave and transmission through the Internet. Also, such functional programs, codes, and code segments can be easily estimated by programmers in the technical field to which the present invention belongs.

Figure 6:
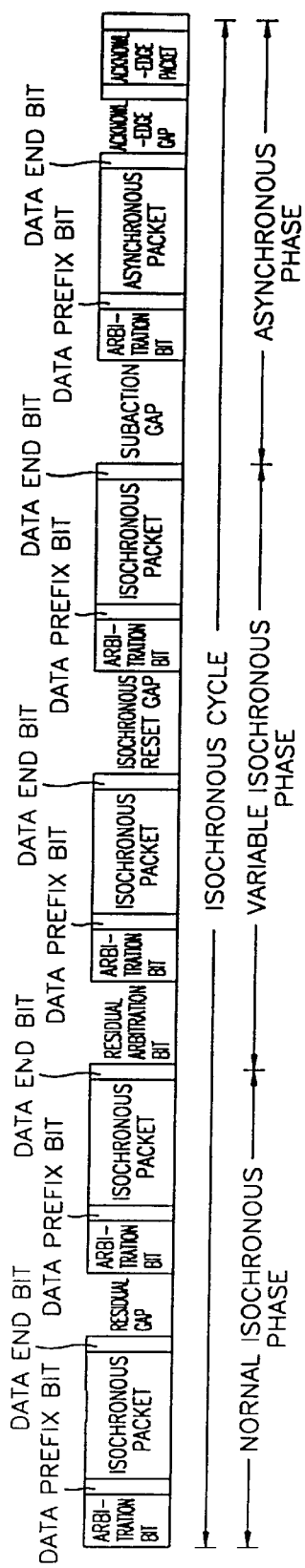
FIG. 6 shows the gap timing of the IEEE 1394 bus for describing the variable isochronous transfer method according to the embodiment of the present invention.

FIG. 6 shows the gap timing of the IEEE 1394 bus for describing a variable isochronous transfer method according to an embodiment of the present invention. Referring to FIG. 6, the gap timing of the IEEE 1394 bus according to the variable isochronous transfer method of the embodiment of the present invention is divided into a normal isochronous phase, a variable isochronous phase, and an asynchronous phase. Two isochronous packets are transferred in the normal isochronous phase. The variable isochronous phase starts by detecting the residual gap. The isochronous packets are transferred when the conditions described with reference to FIG. 5 are satisfied. The isochronous reset gap, transmitted by, for example, another node (not shown), is detected and a concerned isochronous packet is transferred through the bus. The variable isochronous phase is terminated by detecting the subaction gap and an asynchronous packet is transferred through the bus by starting the asynchronous phase. An acknowledge packet is transferred through the bus by another node which receives the asynchronous packet.

Figure 7:
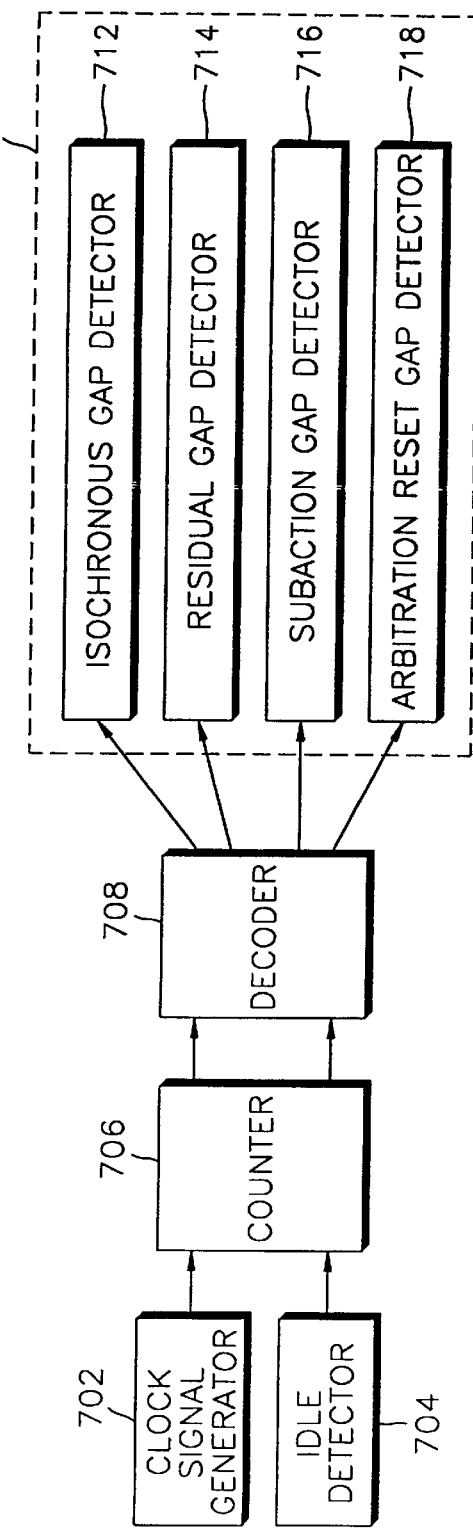
FIG. 7 is a block diagram for showing the structure of hardware for detecting a residual gap in the variable isochronous transfer method according to the present invention.

FIG. 7 is a block diagram for showing the structure of hardware for detecting the residual gap in the gap timing described in FIG. 6. Referring to FIG. 7, residual gap detection means includes a clock signal generator 702, an idle detector 704, a counter 706, a decoder 708, and a gap detector 710.

The clock signal generator 702 outputs a clock signal of a predetermined period. The idle detector 704 detects an idle state and outputs an idle state detection signal. The counter 706 digitizes the time interval of the clock signal in response to the idle state detection signal. The decoder 708 determines which kind of gap is detected by determining the time interval of the idle state according to the digitized value of the counter. The gap detector 710 detects a concerned gap according to the determination value output from the decoder 708.

The gap detector 710 preferably includes an isochronous gap detector 712, a residual gap detector 714, a subaction gap detector 716, and an arbitration reset gap detector 718. The isochronous gap detector 712 detects an isochronous gap which indicates the start of the isochronous data and which has a first predetermined time interval. The isochronous gap has a time interval of 40 through 50 nsec in the case of the IEEE 1394 standard. The time interval of the isochronous gap is set to be the same as the time interval of the acknowledge gap. The residual gap detector 714 detects a residual gap which indicates the start of the residual bandwidth and which has a second predetermined time interval which is larger than the first predetermined time interval. The subaction gap detector 716 detects a subaction gap which indicates the start of the asynchronous transfer phase and which has a third predetermined time interval which is larger than the second predetermined time interval. Finally, the arbitration reset gap detector 718 detects an arbitration reset gap which indicates that arbitration reset is requested and which has a fourth predetermined time interval which is larger than the third predetermined time interval. As mentioned above, the variable isochronous data transfer apparatus including the gap detection means according to the embodiment of the present invention detects a residual gap which indicates the start of the residual bandwidth and which has a second predetermined time interval which is larger than the first predetermined time interval by including the residual gap detector 714 in the gap detector for determining the kind of gap according to the time interval of the gap.

Figure 8:
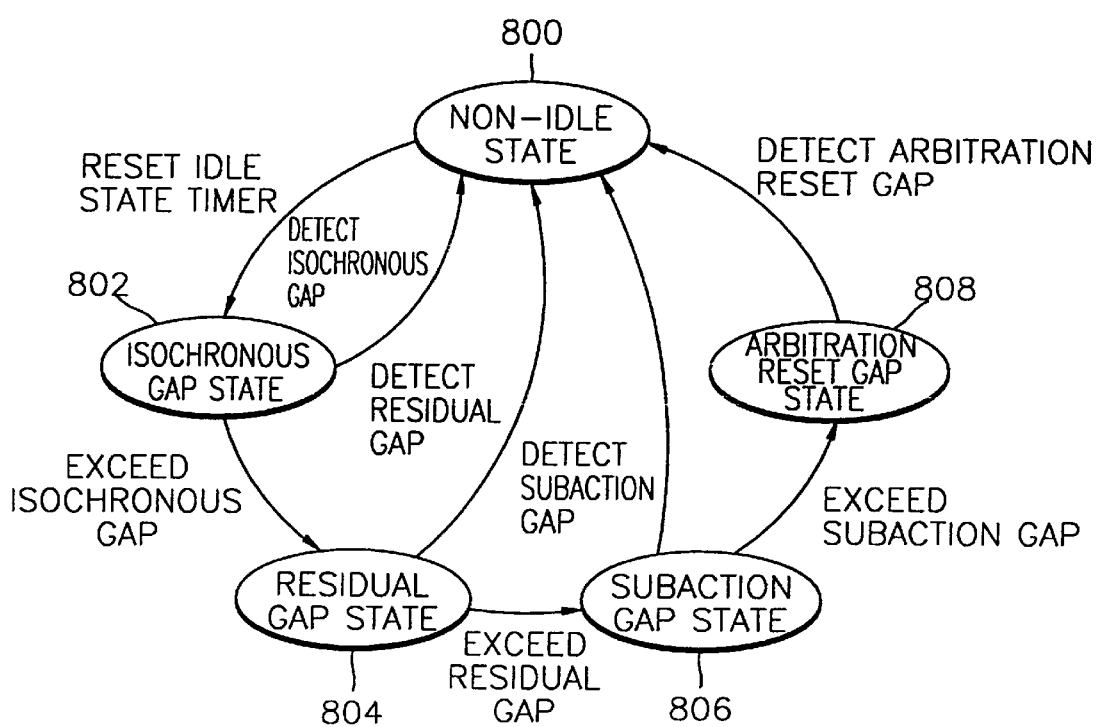
FIG. 8 shows processes of detecting the residual gap in the variable isochronous transfer method according to the present invention.

FIG. 8 shows processes of detecting the residual gap in the variable isochronous transfer method according to the present invention. When the idle state is detected in a non-idle state 800, an idle state timer such as the counter 706 described with reference to FIG. 7 is reset and the non-idle state 800 is transited to an isochronous gap state 802. If the idle state is terminated in the first predetermined time interval and the time interval of the concerned gap measured by the idle state timer is determined to be within the first predetermined time, the isochronous gap is detected and the isochronous gap state 802 is transited to the non-idle state 800. When the time interval of the concerned gap exceeds the first predetermined time interval, it is determined that the concerned gap is not the isochronous gap and the isochronous gap state 802 is transited to a residual gap state 804 for determining whether the concerned gap is the residual gap. When the time interval of the concerned gap exceeds the second predetermined time interval, the residual gap state 804 is transited to the subaction gap state 806. When the time interval of the concerned gap exceeds the third predetermined time interval, the subaction gap state 806 is transited to an arbitration reset gap state 808. Accordingly, gaps having different predetermined time intervals can be detected in the order of the size of the time interval.

Figure 9:
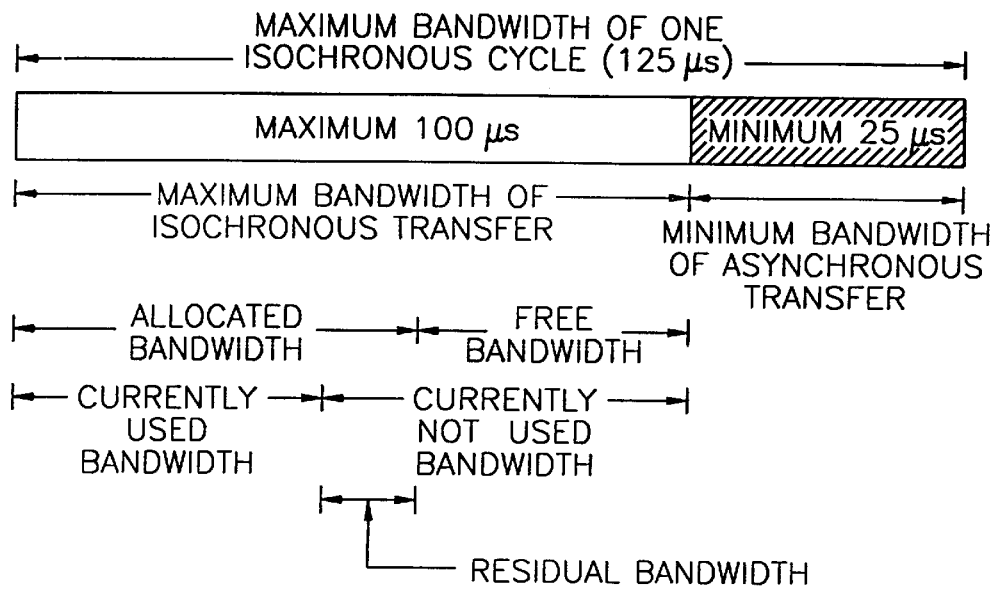
FIG. 9 shows the cycle configuration of the IEEE 1394 bus in the variable isochronous transfer method according to the present invention.

FIG. 9 shows the cycle configuration of the IEEE 1394 bus in the variable isochronous transfer method according to the present invention. Referring to FIG. 9, in the isochronous transfer method according to the conventional technology, the entire assigned bandwidth is considered to be used and notations of residual bandwidth do not exist in the cycle configuration of the IEEE 1394 bus. However, it is possible to detect the residual bandwidth and to transfer isochronous data selectively using the residual bandwidth in the cycle configuration of the IEEE 1394 bus according to the variable isochronous transfer method of the present invention.

Figure 10:
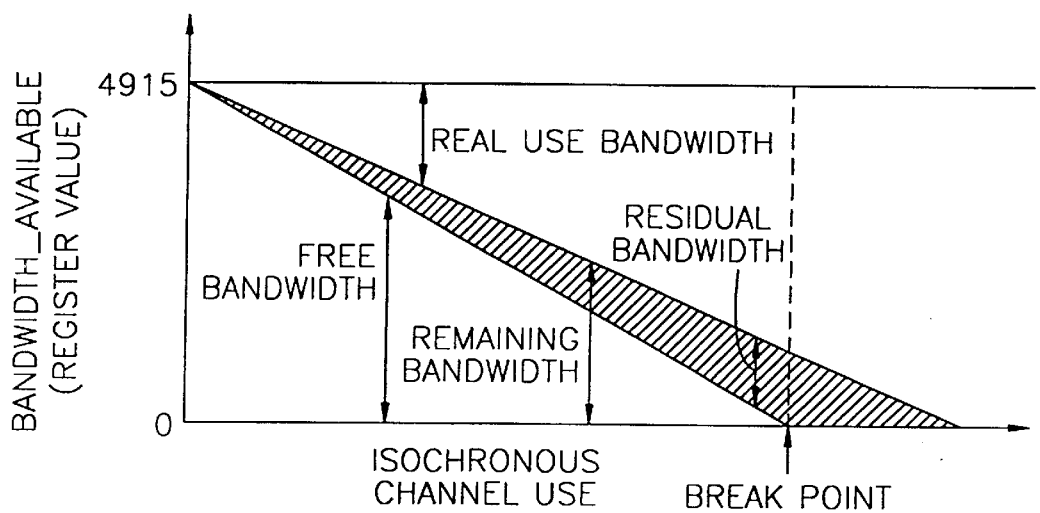
FIG. 10 shows the relationship between the assignment of bandwidth and the use of bandwidth in the IEEE 1394 bus in the variable isochronous transfer method according to the present invention.

FIG. 10 shows the relationship between the assignment of bandwidth and the use of bandwidth in the IEEE 1394 bus in the variable isochronous transfer method according to the present invention. Referring to FIG. 10, even in the case of a break point, namely, the point from which no more isochronous resources can be assigned, it is possible to perform the isochronous transfer using the variable isochronous phase by the residual bandwidth.

A new ABR data transfer method for 1394 (ABR-1394) which is similar to the ABR service of the ATM will be explained as a method for utilizing remaining bandwidth recognized by the above-mentioned variable isochronous data transfer method. Some multimedia data having a variable bit rate can be effectively transferred using the ABR-1394 service. In order to provide a technical understanding, the ABR service of the ATM will be described.

There are applications where bandwidth to be used cannot be correctly predicted among the applications. In these cases, the ABR service of the ATM (an ABR-ATM service) is used. The ABR service is applied to the variable isochronous transfer method according to the embodiment of the present invention.

FIG. 11 is a view for explaining the control of the flow of the ABR service. Referring to FIG. 11, an additional closed end-to-end control loop is formed in order to control the flow of the transferred data in the ABR-ATM service. A resource management (RM) cell for checking network traffic is transferred through the control loop. Traffic information is recorded in the RM cell and the RM cell passes through network elements (NE) to a destination (D) and returns to a source (5). One RM cell is transferred to each of N data cells. Here, a congestion-marking bit is included in the simplest method for recording information in the RM cell in order to control the transfer rate of the source. An explicit cell rate is indicated in a more developed method. If the RM cell is not returned to the source, congestion is assumed and the source automatically reduces the transfer rate. The ABR-ATM service where bandwidth left after being assigned to the CBR and VBR services is used is used for applications having high resilience such as file transfer and mail on protocols such as TCP/IP, IPX/SPX, and APPN.

Also, a method of utilizing the discriminated remaining bandwidth in the applications must be provided. What matters is how to provide the method. The VBR and ABR services are not directly supported in the IEEE 1394 standard among the transfer modes of the ATM. However, since the VBR service has significantly more complicated transfer parameters and connection admission control mechanism, it is difficult to directly support the VBR service in the IEEE 1394 standard which realizes a distribution protocol. Therefore, a transfer service corresponding to the ABR service of the ATM which has a common point of using the remaining bandwidth with the VBR service is realized. The ABR-ATM is not suitable for the transfer of multimedia data since real time transfer is not assumed in the ABR-ATM. However, the ABR-1394 to be provided can be used for the transfer of multimedia data since real-time transfer using the isochronous bandwidth can be performed in the ABR-1394. Hereinafter, a variable isochronous transfer method according to another embodiment of the present invention, which is called ABR-1394 will be described.

FIG. 12 shows the structure of the bandwidth in the variable isochronous transfer method according to another embodiment of the present invention. Referring to FIG. 12, minimum bandwidth (MBW) and peak bandwidth (PBW), which must be satisfied, are specified like in the ABR-ATM in applications where variable bit rate data are to be transferred using the ABR-1394. Since the MBW must be satisfied, the MBW is processed using normal isochronous bandwidth assignment and transfer methods. Variable bandwidth (VBW) obtained by subtracting the MBW from the PBW is processed in a variable isochronous phase (VIP) since whether to transfer the isochronous data is determined according to the load on the current bus in the VBW. Since it is difficult to dynamically change the size of the packet of the IEEE 1394, bus which determines the bandwidth, once the size of the packet is determined, the VBW is set to a multiple of the MBW. If the VBW is not a multiple of the MBW, a multiple of PBW included in the VBW is assigned as the bandwidth. Downsizing of a PBW lower than the PBW lower specified by a user is performed so that the capacity of a buffer maintained in the application is not exceeded. Also, connection admission is performed only by the MBW in the ABR-1394. Namely, if the isochronous bandwidth can be assigned by the MBW, it is possible to use the concerned ABR-1394 service.

A variable isochronous data transfer method according to another embodiment of the present invention will now be described. The variable isochronous data transfer method is for realizing the ABR-1394 service which is defined above. The core of the variable isochronous data transfer method is a method of constituting and managing the buffer. According to the variable isochronous data transfer method according to this embodiment of the present invention, the packet of the variable bandwidth left after being transferred in a normal constant isochronous transfer phase (CIP), is transferred in the variable isochronous transfer phase (VIP) bandwidth assigned as the MBW in the ABR-1394. At this time, the packet left in the VIP is transferred within a range allowed by the PBW and the remaining bandwidth. It is necessary to separate a conventional isochronous transmission FIFO (ITF) into two buffers, namely, a constant isochronous transfer buffer (CITF) and a variable isochronous transfer buffer (VITF). This is because normal isochronous packet transfer may be prevented by the variable bandwidth of the ABR where it is not possible to correctly predict how many packets can be transferred when the conventional ITF is used without being separated. FIG. 13 shows the structure of a buffer for the transfer of the ABR-1394 data. Referring to FIG. 13, the part corresponding to the MBW is moved from the VITF to the CITF and is transferred since the MBW in the ABR data must be guaranteed to be transferred through the separated VITF. The part corresponding to the MBW cannot be moved to the CITF from the beginning because the transfer order of the packets must be maintained, that is, the packets left after being transferred in a previous VIP must be transferred in the CIP. Separate buffers must be used for the respective ABR service requests in the case of the VITF. Meanwhile, a common CITF is used for all isochronous requests. This is because it is not possible to predict the size of the VBW included in each ABR request, namely, the number of packets, in the respective cycles.

FIG. 14 shows an example of processes of transferring data by a variable isochronous data transfer method according to another embodiment of the present invention. Referring to FIG. 14, the processes of transferring data by the variable isochronous data transfer method according to this embodiment of the present invention corresponds to the example of the data transfer performed in an arbitrary bit rate (ABR) node in which the separate buffers of FIG. 13 are used. When the ABR-1394 packets included in the variable bandwidth cannot be accepted in the remaining bandwidth calculated by an internal clock signal generator, the ABR-1394 packets are transferred in the next cycle. No more than (N−2) packets are transferred as described with reference to FIG. 12 since the data transfer having a bandwidth more than the PBW, must not be performed even if the amount of remaining bandwidth is more than the variable bandwidth.

Since the isochronous stream packets transferred in the VIP are transferred with no bandwidth assigned, when large load is applied to the bus, a shortage of bandwidth where data corresponding to the variable bandwidth cannot be transferred at all by other nodes excluding the nodes having large node IDs, may occur. This is caused by the arbitration mechanism of the IEEE 1394 bus based on the node IDs. In order to solve this problem, fairness with respect to the use of the remaining bandwidth is provided using fairness interval notations used for the asynchronous transfer. In order to realize the fairness, a method of recording the start of the fairness interval and the use of the fairness interval with respect to the isochronous transfer of data must be provided, like in the asynchronous transfer. For this, a new gap, which is larger than the residual gap defined above and smaller than the subaction gap used in the asynchronous phase, and an enable bit are necessary. The new gap is called an isochronous reset gap and the new bit is called an isochronous arbitration enable bit. Therefore, the VIP of FIG. 11 can start by the residual gap or the isochronous transfer reset gap like the asynchronous phase. Between the sizes of the gaps newly defined in the present invention and the conventional gap, the relationship, acknowledge gap= isochronous gap<residual gap<subaction gap is concluded. The ABR-1394 service can be used with two options, real-time (RT) and non real-time (NRT).

FIG. 15 shows the main steps of a variable isochronous transfer method according to another embodiment of the present invention. Processes of transferring isochronous packets in the variable bandwidth including the real-time option are shown with reference to FIG. 15. When the residual gap is detected, a phase is transited to the variable isochronous phase and it is determined whether the detected gap is the isochronous reset gap. When the detected gap is determined to be the isochronous reset gap, an isochronous arbitration reset bit is enabled. When the detected gap is determined not to be the isochronous reset gap, it is determined whether the isochronous reset bit is enabled. When the isochronous reset bit is not enabled, the process proceeds to the asynchronous phase. It is determined whether real-time packets exist. When real-time packets exist, a step of checking the timing of the packets is performed. When there are packets which deviate from a real-time reference, the packets are thrown away. A step for performing the transfer of the packets is performed on the packets which do not deviate from the real-time reference. It is determined whether the bandwidth is sufficient with respect to packets which are not real-time packets and packets which do not deviate from the real-time reference, and arbitration is performed on the above packets. When the arbitration has successfully performed, the packets have been transferred, the isochronous arbitration reset bit has been disabled, and a transfer channel has been changed to an arbitrary bit rate (ABR) channel, a phase is transited to the asynchronous phase. Therefore, if the real-time option is not used, the timing is not checked and the packets are not thrown away.

As mentioned above, additional flow control using the RM cell must be performed in order to maintain the minimum cell rate (MCR) and to utilize the remaining bandwidth in the ABR-ATM. However, additional flow control is not necessary in the variable isochronous data transfer method according to another embodiment of the present invention (ABR-1394) since the MBW is guaranteed by normal isochronous transfer, the remaining bandwidth is automatically recognized, and the use of the remaining bandwidth is maximized. Namely, the ABR-1394 application can directly control the transfer rate according to the state of the bus. A cell loss ratio (CLR) is specified in the ABR-ATM and an ATM switch maintains the CLR. However, in the ABR-1394, the loss ratio with respect to the packets included in the variable bandwidth is not controlled. The ABR-1394 maintains fairness with respect to the use of the remaining isochronous bandwidth in the same way as the ABR-ATM which maintains fairness with respect to the use of the remaining bandwidth. The ABR-1394 allows restricted isochronous bandwidth to be effectively used and relatively reduces the size of a unit channel using the MBW, thus allowing more isochronous channels to be simultaneously used. The characteristics of the ABR-ATM are simply compared with the characteristics of the ABR-1394 in Table 4.

TABLE 4

| Transfer service classification | ABR-ATM | ABR-1394 |
|---|---|---|
| Input variables | PCR, MCR, and CLR | PBW and MBW |
| Guaranteed bandwidth | MCR | MBW |
| Used bandwidth | Remaining bandwidth of assigned CBR and VBR bandwidth | Remaining bandwidth of assigned isochronous and minimum asynchronous bandwidth |
| Transfer rate control | Use RM cells | Self control |
| Fairness | Non-used bandwidth | Non-used isochronous bandwidth |
| Real-time transfer | Unapplicable | Supported by real-time (RT) option |

Also, the real-time (RT) ABR-1394 service has an advantage of providing improved quality by receiving additional data, while maintaining compatibility with the 1394-1995 standard.

Since the residual gap, the isochronous reset gap, and the isochronous reset bit are defined in order to support the bandwidth stealing and the ABR-1394 service, it is necessary to modify a physical layer, namely, the PHY chip for the residual gap, the isochronous reset gap, and the isochronous reset bit. Also, it is necessary to modify a link layer since the remaining isochronous remaining bandwidth within 100 $\mu$s must be able to be calculated using a clock counter of the node. Finally, it is necessary to modify the structure of a new VITF provided for the ABR-1394 service and a DMA engine for controlling the VITF.

As mentioned above, an isochronous data transfer method by the bandwidth stealing technique for discriminating the remaining isochronous bandwidth which is not used in the IEEE-1394 bus is provided in the present invention. Also, the ABR transfer service for 1394 (ABR-1394) which is similar to the ABR service of the ATM (ABR-ATM), by which it is possible to effectively transfer multimedia data in the form of VBR, is provided on the basis of the isochronous data transfer method.

As mentioned above, according to the variable isochronous data transfer method of the present invention, it is possible to maximize the isochronous transfer by selectively using the residual bandwidth, which is assigned for the transfer of the isochronous data but is not used for the real transfer of the isochronous data, for the transfer of the isochronous data.

Also, a chance of transferring multimedia data in the form of the VBR is provided to the 1394 isochronous transfer where only multimedia data in the form of the CBR is assumed. Also, the ABR-1394 transfer service, based on the provided technique corresponding to the ABR service which is useful in the ATM, is simpler and more effective than the ABR-ATM since the real-time transfer function is additionally provided and it is not necessary to perform additional flow control.

Additional advantages and modifications will readily occur to those skilled in the art. Therefore, the invention in its broader aspects is not limited to the specific details shown and described herein. Accordingly, various modifications may be made without departing from the spirit or scope of the general inventive concept as defined by the appended claims and their equivalents.

What is claimed is:

1. An isochronous data transfer method for isochronously transferring data within a predetermined time interval on an IEEE 1394 bus, comprising the steps of:
   (a) detecting a residual gap having a time interval which is larger than the time interval of an isochronous gap period and smaller than a time interval of a subaction gap;
   (b) checking whether bandwidth for the transfer of isochronous data remains when the residual gap is detected in the step (a); and
   (c) transferring the isochronous data when it is determined that the bandwidth remains in the step (b).

2. The method of claim 1, further comprising a step performed before step (a) of determining isochronous transfer to be terminated when the bus is in an idle state for a time interval which is larger than an isochronous gap period, and further comprising a step performed after step (b) of detecting the termination of remaining bandwidth by counting whether another predetermined time interval has passed after receiving a cycle start packet.

3. An isochronous data transfer method for isochronously transferring data within a predetermined time interval on an IEEE 1394 bus, comprising the steps of:
   (a) detecting a residual gap having a time interval larger than a time interval of an isochronous gap and smaller than a time interval of a subaction gap;
   (b) detecting a first isochronous reset gap having a time interval which is larger than the time interval of the residual gap and smaller than the time interval of the subaction gap when the residual gap is detected in the step (a);
   (c) determining whether residual bandwidth exists in which the isochronous transfer of data can be performed when the isochronous reset gap is detected in the step (b);
   (d) confirming whether a transfer of isochronous data is performed in a current isochronous reset gap when the isochronous reset gap is not detected in the step (b);
   (e) transferring isochronous packets when it is determined that residual bandwidth exists in the step (c); and
   (f) detecting a second isochronous reset gap having a time interval larger than the time interval of the residual gap and smaller than the time interval of the subaction gap, returning the process to the step (c) when the isochronous reset gap is detected, and terminating a variable isochronous data transfer phase and proceeding the process to an asynchronous phase when the isochronous reset gap is detected.

4. The method of claim 3, further comprising a step of detecting the termination of the remaining bandwidth by counting whether another predetermined time interval has passed after receiving a cycle start packet.

5. An isochronous data transfer apparatus for transferring data of a prespecified time interval within a predetermined time on an IEEE 1394 bus, comprising:
   means for detecting a residual gap having a time interval which is larger than time intervals of an isochronous gap, and smaller than the time interval of a subaction gap;
   means for determining whether sufficient bandwidth remains for a transfer of the isochronous data when the residual gap is detected by the detection means; and
   means for transferring the isochronous data when it is determined by the determining means that sufficient bandwidth remains.

6. The apparatus of claim 5, further comprising means for detecting the termination of remaining bandwidth by counting whether another predetermined time interval has passed after receiving a cycle start packet.

7. The apparatus of claim 5, wherein the gap detection means comprises:
   a clock signal generator for outputting a clock signal of a predetermined period;
   an idle detector for detecting an idle state;
   a counter for digitizing the clock signal in response to the clock signal output from the clock signal generator and an idle state detection signal output from the idle detector;
   a decoder for determining a time interval of the idle state according to the digitized value of the counter;
   an isochronous gap detector for detecting an isochronous gap having a first predetermined time interval;
   a residual gap detector for detecting a residual gap having a second predetermined time interval which is larger than the first predetermined time interval;
   a subaction gap detector for detecting a subaction gap having a third predetermined time interval which is larger than the second predetermined time interval; and
   an arbitration reset gap detector for detecting an arbitration reset gap having a fourth predetermined time interval which is larger than the third predetermined time interval.

8. The apparatus of claim 7, wherein, when a time interval between the time interval of the isochronous gap and the time interval of the subaction gap is T and an arbitrary integer larger than 1 is N, the clock signal output from the clock signal generator has a period of T/N.

9. An isochronous data transfer apparatus for isochronously transferring data within a predetermined time interval on an IEEE 1394 bus, comprising:
   means for detecting a residual gap having a time interval which is larger than a time interval of an isochronous gap and smaller than a time interval of a subaction gap;
   means for detecting a first isochronous reset gap having a time interval which is larger than the time interval of a residual gap and smaller than the time interval of the subaction gap when the residual gap is detected by the detection means;
   means for checking whether there is residual bandwidth in which the isochronous transfer of data can be performed when the isochronous reset gap is detected by the first isochronous reset gap detection means;
   means for determining whether the transfer of the isochronous data is performed in a current isochronous reset gap when the isochronous reset gap is not detected by the first isochronous reset gap detection means;
   means for transferring an isochronous packet when it is determined by the residual bandwidth determining means that residual bandwidth exists; and
   means for detecting a second isochronous reset gap having a time interval which is larger than the time interval of the residual gap and smaller than the time interval of the subaction gap, driving the residual bandwidth determining means when the isochronous reset gap is detected, and terminating an operation of transferring the variable isochronous data and driving asynchronous transfer means when the isochronous reset gap is detected.

10. The apparatus of claim 9, wherein the gap detection means comprises:

a clock signal generator for outputting a clock signal of a predetermined period;

an idle detector for detecting an idle state;

a counter for digitizing the clock signal in response to the clock signal output from the clock signal generator and the idle state detection signal output from the idle detector;

a decoder for determining a time interval of the idle state according to the digitized value of the counter;

an isochronous gap detector for detecting an isochronous gap having a first predetermined time interval;

a residual gap detector for detecting a residual gap having a second predetermined time interval which is larger than the first time interval;

an isochronous reset gap detector for detecting an isochronous reset gap having a third predetermined time interval which is larger than the second time interval;

a subaction gap detector for detecting a subaction gap having a fourth predetermined time interval which is larger than the third predetermined time interval; and an arbitration reset gap detector for detecting an arbitration reset gap having a fifth predetermined time interval which is larger than the fourth predetermined time interval.

* * * * *